Figure 1:
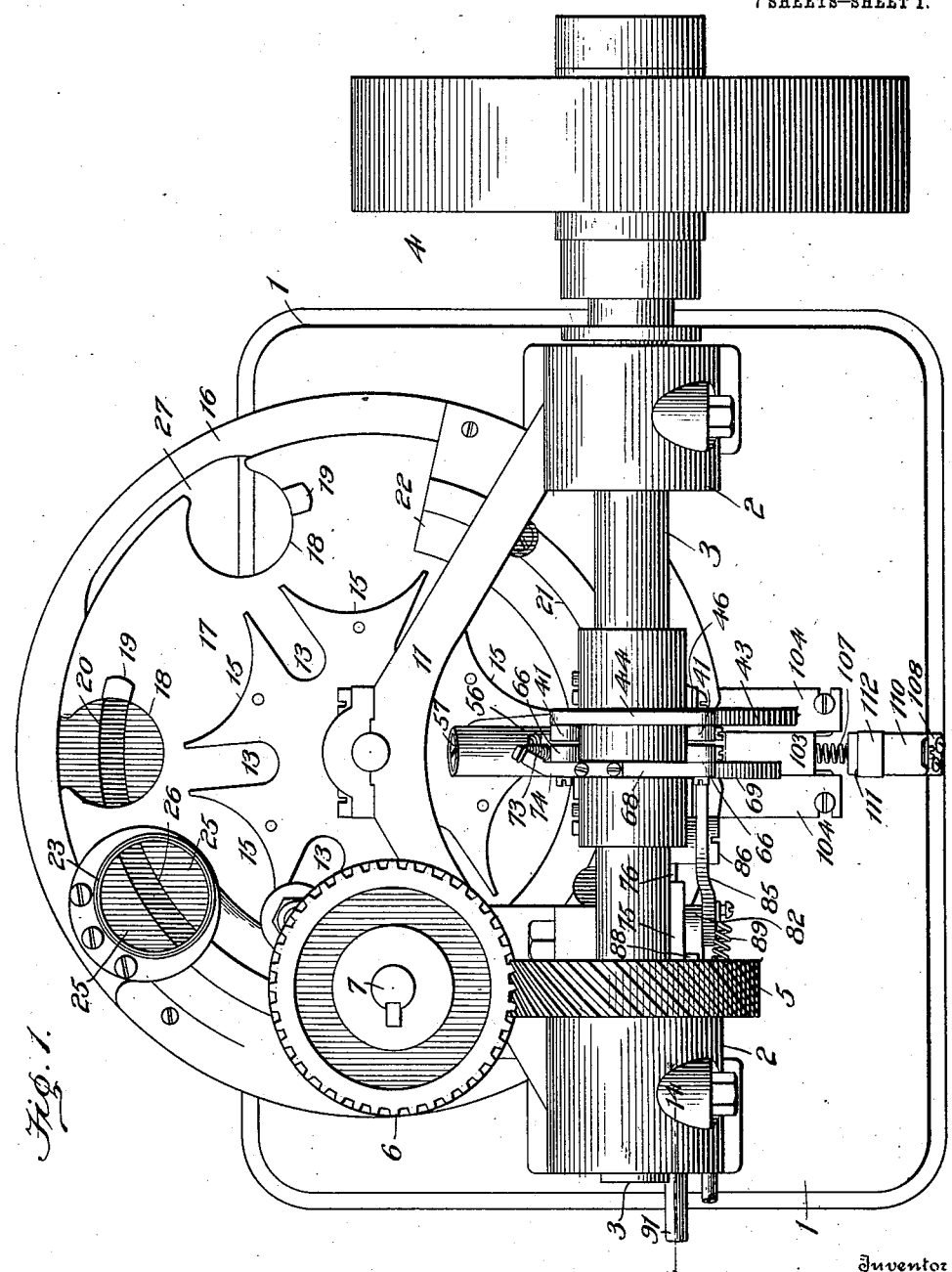

A. B. HINES.
MACHINE FOR MAKING RECEPTACLE CLOSURES.
APPLICATION FILED APR. 13, 1906.

1,011,787.

Patented Dec. 12, 1911.

7 SHEETS—SHEET 1.

Witnesses
Edwin L. Bradford
Ernest H. Riley

Inventor
Albert B. Hines
By
Attorneys

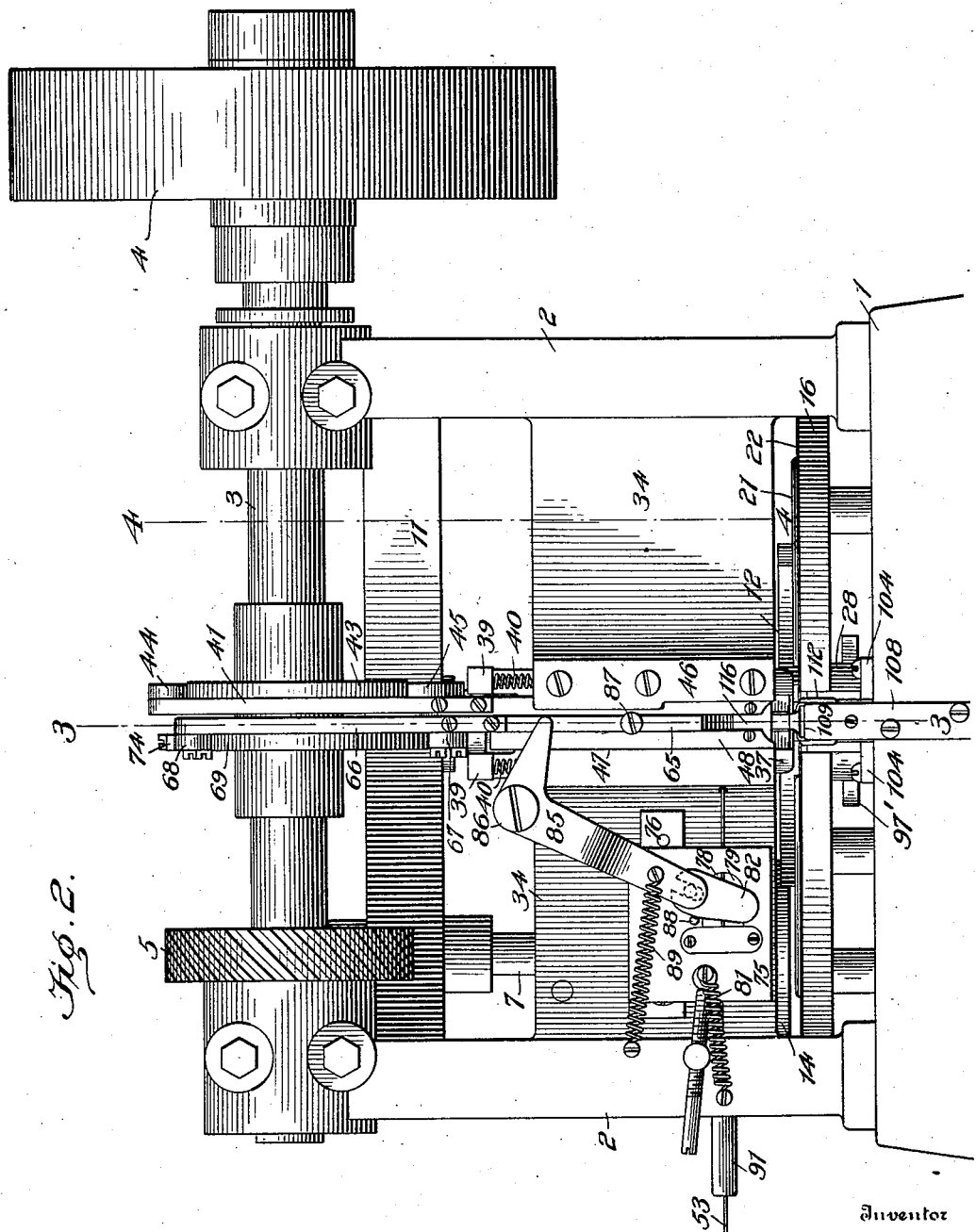

A. B. HINES.
MACHINE FOR MAKING RECEPTACLE CLOSURES.
APPLICATION FILED APR. 13, 1906.
1,011,787.
Patented Dec. 12, 1911.
7 SHEETS—SHEET 3.
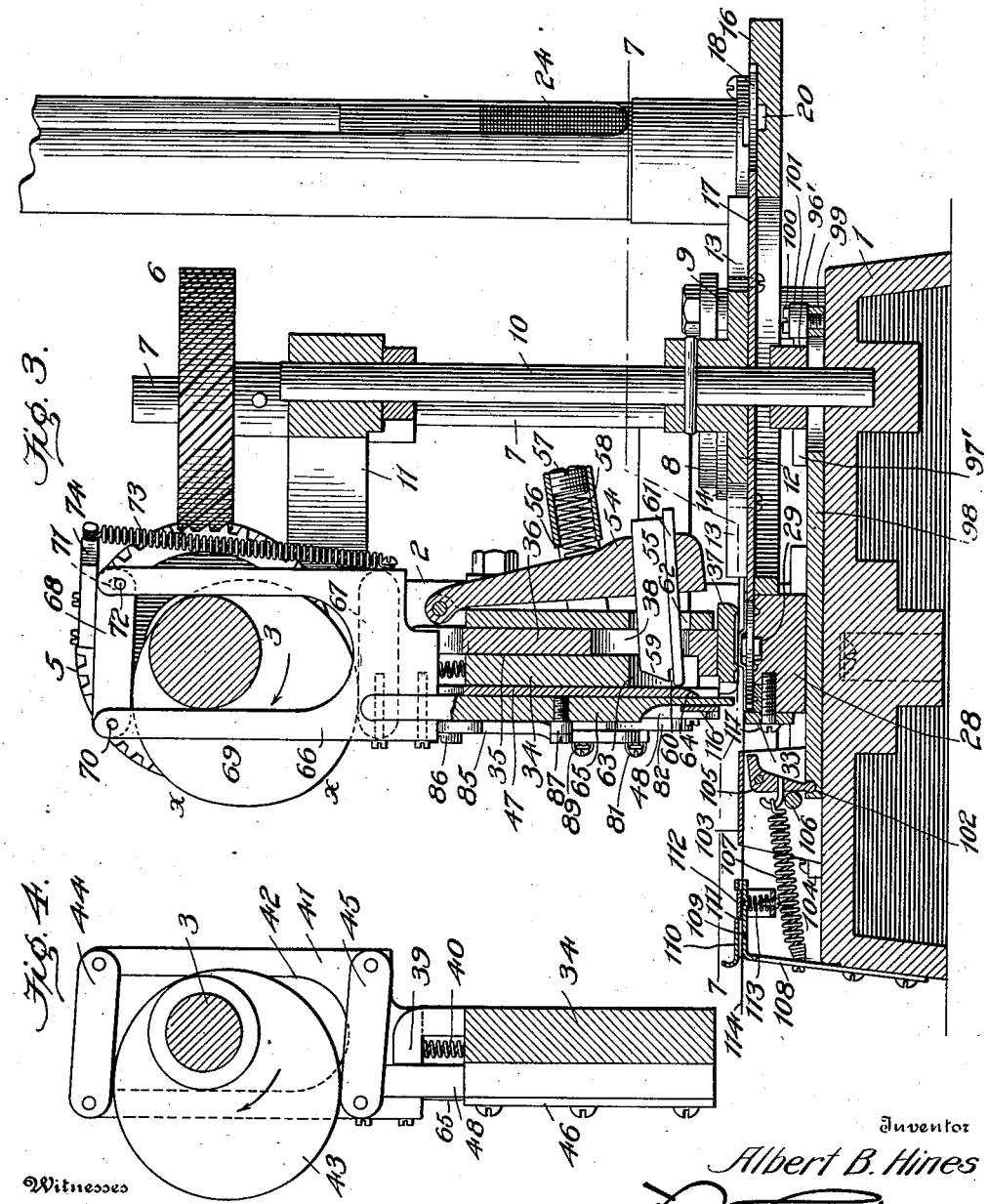
Witnesses
Edwin L. Bradford
Ernest F. Riley
Inventor
Albert B. Hines
By
Attorneys A. B. HINES.
MACHINE FOR MAKING RECEPTACLE CLOSURES.
APPLICATION FILED APR. 13, 1906.
1,011,787.
Patented Dec. 12, 1911.
7 SHEETS—SHEET 4.
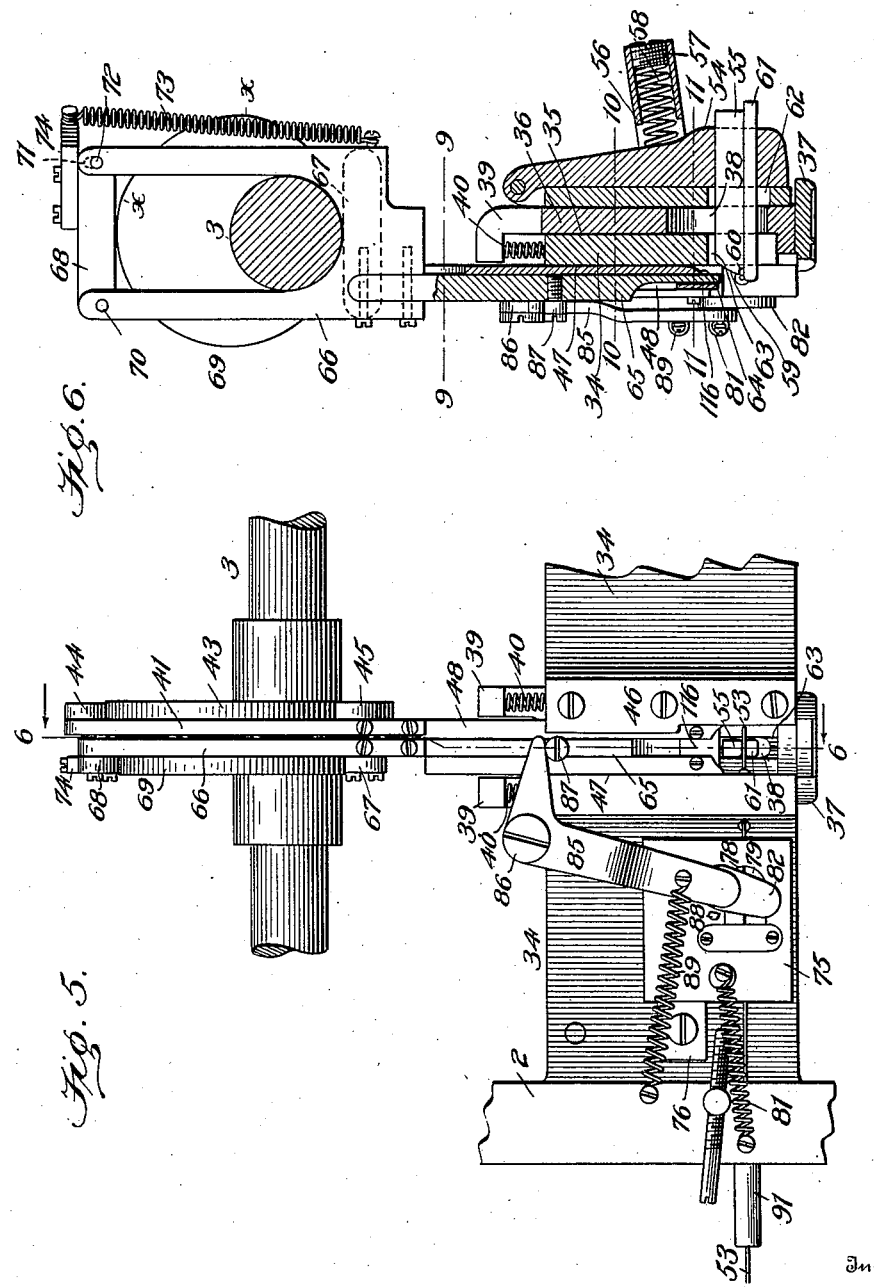
Witnesses
Edwin L. Bradford
Ernest N. Riley
Inventor
Albert B. Hines
By
Attorneys A. B. HINES.
MACHINE FOR MAKING RECEPTACLE CLOSURES.
APPLICATION FILED APR. 13, 1906.
1,011,787.
Patented Dec. 12, 1911.
7 SHEETS—SHEET 5.
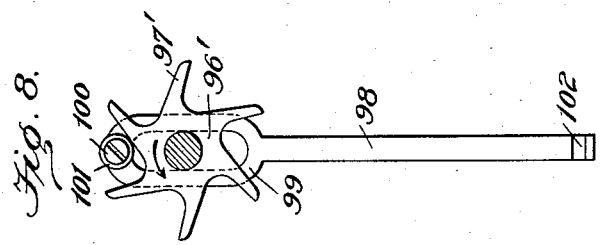
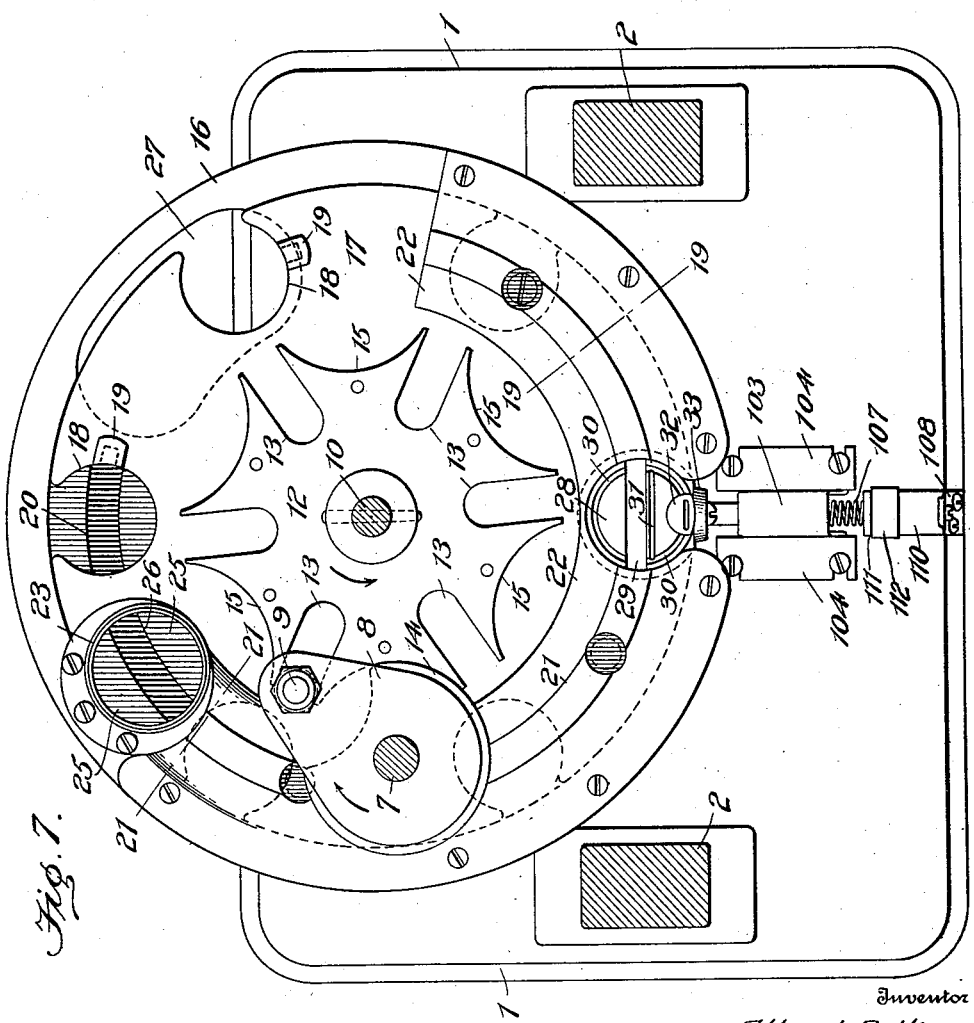
Witnesses
Edwin L. Bradford
Ernest F. Riley
Inventor
Albert B. Hines
By
Attorneys

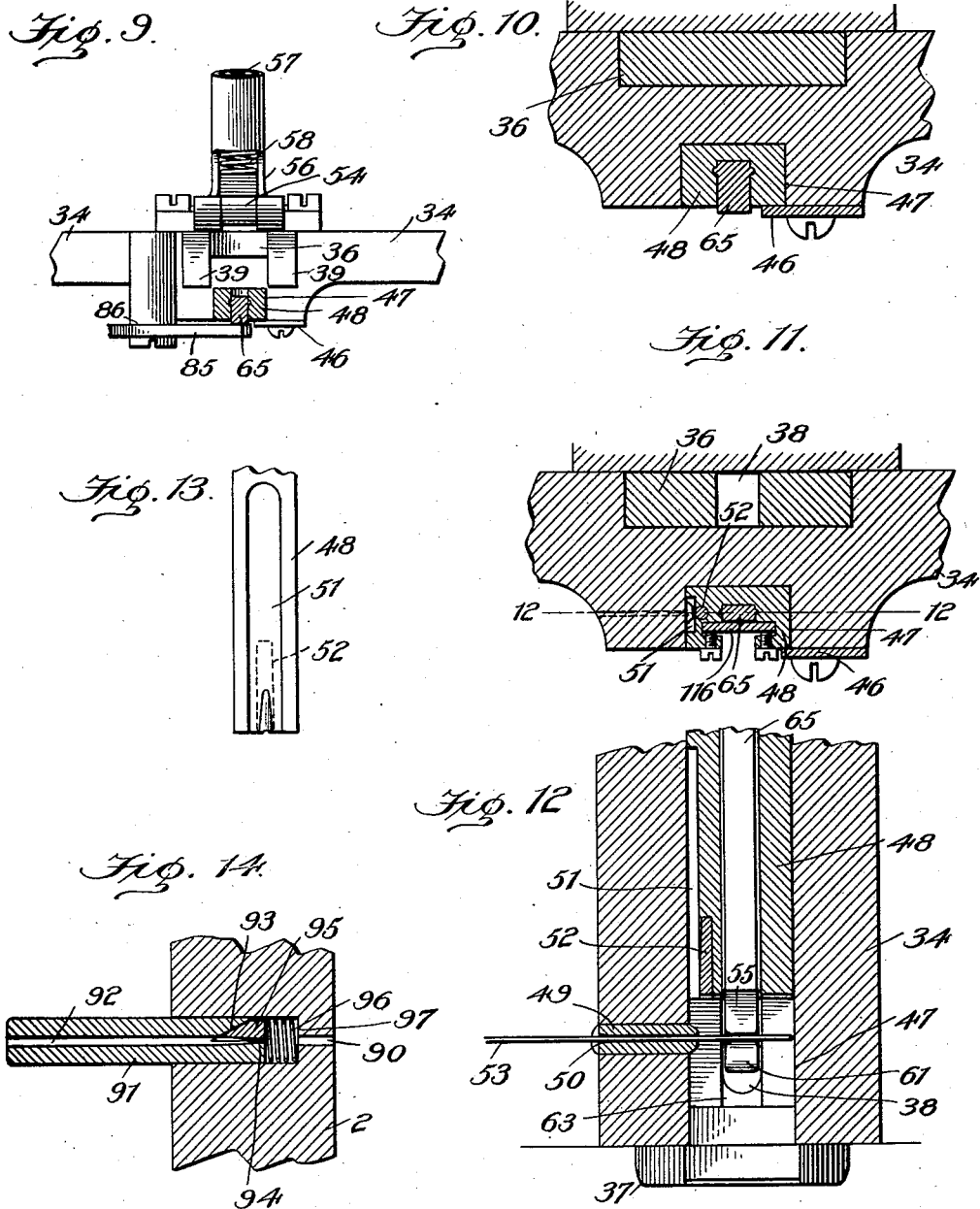

A. B. HINES.
MACHINE FOR MAKING RECEPTACLE CLOSURES.
APPLICATION FILED APR. 13, 1906.
1,011,787.
Patented Dec. 12, 1911.
7 SHEETS—SHEET 7.
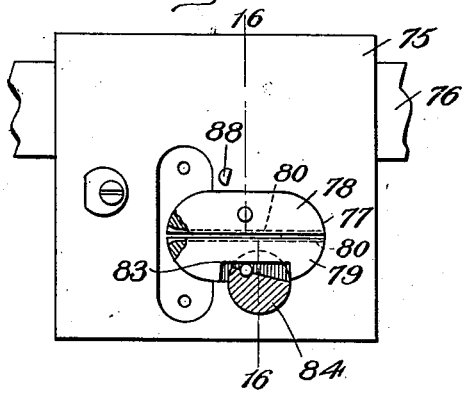
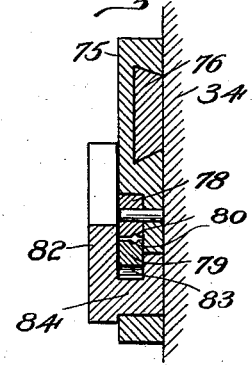
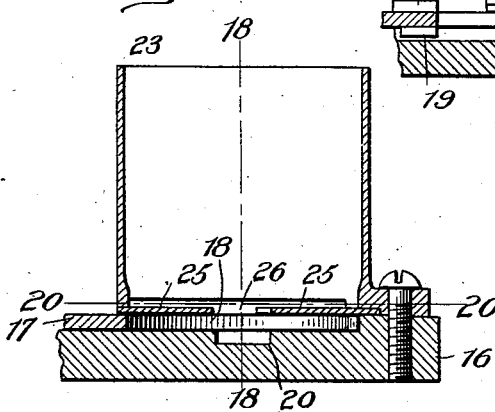
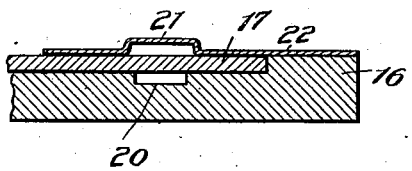
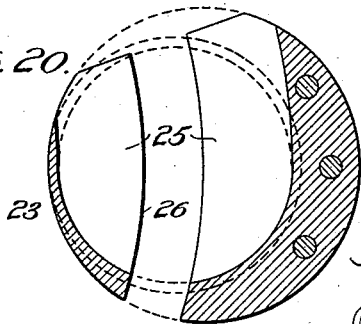
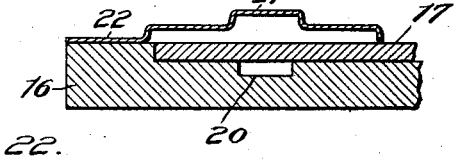
Witnesses
Edwin L. Bradford
Ernest H. Riley
Inventor
Albert B. Hines
By
Attorneys

UNITED STATES PATENT OFFICE.

ALBERT B. HINES, OF WASHINGTON, DISTRICT OF COLUMBIA, ASSIGNOR TO THE AMERICAN DAIRY SUPPLY COMPANY, OF AUGUSTA, MAINE, A CORPORATION OF MAINE.

MACHINE FOR MAKING RECEPTACLE-CLOSURES.

1,011,787.  Specification of Letters Patent.  Patented Dec. 12, 1911.

Application filed April 13, 1906. Serial No. 311,439.

*To all whom it may concern:*

Be it known that I, ALBERT B. HINES, a citizen of the United States, residing at Washington, District of Columbia, have invented new and useful Improvements in Machines for Making Receptacle-Closures, of which the following is a specification.

This invention relates to machines for attaching tabs or handles to stock or sheets, and more particularly relates to mechanism for use in the manufacture of receptacle closures, such as bottle or jar closing disks; and the objects and nature of the invention will be readily understood by those skilled in the art in the light of the following explanation of the mechanisms disclosed in the accompanying drawings as examples for purposes of illustration from among other constructions and arrangements within the spirit and scope of my invention.

My invention consists in certain novel features of construction and in combinations and arrangements of parts as more fully and particularly set forth hereinafter.

In the accompanying drawing:—Figure 1 is a top plan view of the machine. Fig. 2 is a front elevation of the machine. Fig. 3 is a vertical sectional view of the machine cut on the line 3—3 of Fig. 2. Fig. 4 is a vertical sectional view of the upper portion of the machine cut on the line 4—4 of Fig. 2. Fig. 5 is a front elevation of an intermediate portion of the machine showing the wire feeding device. Fig. 6 is a vertical sectional view of the machine as shown in Fig. 5 cut on the line 6—6. Fig. 7 is a horizontal sectional view of the machine cut on the line 7—7 of Fig. 3. Fig. 8 is a top plan view of the bar for operating the handle stock feeding mechanism. Fig. 9 is a horizontal sectional view of Fig. 6 cut on the line 9—9 thereof. Fig. 10 is a horizontal view of Fig. 6 cut on the line 10—10 thereof. Fig. 11 is a horizontal sectional view of Fig. 6 cut on the line 11—11 thereof. Fig. 12 is a vertical sectional view of Fig. 11 cut on the lines 12—12 thereof. Fig. 13 is an edge view of the lower end of the cutter bar. Fig. 14 is a sectional view of the wire tension device cut on the line 14—14 of Fig. 1. Fig. 15 is a face view of the reciprocating block used in the wire feeding device. Fig. 16 is a vertical sectional view of the device as shown in Fig. 15 cut on the lines 16—16 thereof. Fig. 17 is a vertical sectional view cut on the line 17—17 of Fig. 18 showing the lower portion of the tube for containing a column of disks. Fig. 18 is a vertical sectional view of the lower end of the tube as shown in Fig. 17 cut on the line 18—18 thereof. Fig. 19 is a vertical sectional view cut on the line 19—19 of Fig. 7. Fig. 20 is a horizontal sectional view cut on the line 20—20 of Fig. 17. Fig. 21 is a vertical sectional view of the machine cut on the line 21—21 of Fig. 7, and, Fig. 22 is a perspective view of the finished cap.

*The cap conveying mechanism.*—The machine consists of the base or bed plate 1 upon which is erected the vertical standards 2—2. The shaft 3 is journaled at the upper ends of said standards and is provided at one end with a pulley or fly wheel 4. The worm gear wheel 5 is fixed to the said shaft 3 and is adapted to mesh with the horizontal worm gear wheel 6 fixed to the upper end of the vertical shaft 7. To the lower end of said shaft 7 is fixed a crank 8 having a pin 9. The shaft 10 is journaled at its lower end in the bed plate 1 and at its upper end in the arms 11 which extend back from the uprights 2—2. The star wheel 12 is fixed to the said shaft 10 and the said pin 9, carried by the crank 8 is adapted to enter the recesses 13 of the said star wheel. The concentric disk 14, also attached to the shaft 7 just below the eccentric 8, enters the concavities 15 in the periphery of the star wheel 12. The annular guide way 16 is concentrically located with relation to the shaft 10 above the bed plate 1, the disk 17 is attached at its center to the shaft 10 and the periphery of the said disk 17 passes over the upper surface of the guide way 16. The said disk 17 is provided in its edge with a number of circular recesses 18 each of which is just large enough to receive a jar cap, as will be hereinafter explained. Just behind each recess 18 and upon the upper and under surfaces of the disk 17 are located the lugs 19—19, the under one of which is adapted to work in the channel 20 of the guide 16 and the upper one in a channel 21 of a shield 22, which extends part of the way around the edge of the disk 17. The cap tube 23 is located upon the guide way 16 and extends at its lower end over the edge of the disk 17. As shown in Fig. 7 of the drawing, the shield 22 extends from one side of the cap tube 23 about two thirds of the way around the edge of the disk 17. The said cap tube 23 is adapted to contain the paper caps 24 in a vertical stack. The said caps may be loaded into the tube by any suitable means. In the bottom of the tube is located a plate 25 having the groove 26 through which the upper lugs 19 are adapted to pass and remove the bottom cap from the stack, which is then carried around the guide way 16 under the shield 22, and within one of the recesses 18 of the disk 17 to the dies as will be hereinafter more fully explained. The guide way 16 is provided with an elongated opening 27 which is located under the path of the recesses 18 of the disk 17.

The operation of the mechanism thus far described is as follows: A stack of caps 24 is placed in the tube 23. Power is applied to the wheel 4 which is rotated and which in turn rotates the spiral gear wheel 6 and the shaft 7. The concentric disk 14 rotates in one of the concavities 15 of the star wheel 12 in the direction indicated by the arrow in the Fig. 7 and as the crank 8 revolves the pin 9 is carried around, which enters one of the slots 13 in the edge of the star wheel 12 and carries the said star wheel around in the direction as indicated in the arrow in said Fig. 7 until the edge of the concentric disk 14 enters the next adjacent concavity 15 of the star wheel 12. The said star wheel 12 is at rest while the concentric disk 14 is in any one of the concavities 15 of the said wheel but as soon as the pin 9 enters any one of the recesses 13 the said star wheel and its attachments begin to rotate. Thus the movement of the star wheel is intermittent or not continuous. As the said star wheel 12 moves, it carries around with it the disk 17. As the upper lugs 19 pass through the slot 26 in the plate 25 in the bottom of the tube 23, it pushes against the edge of the under cap 24, and carries the said cap forward in the same direction as that in which the disk 17 is traveling. When the rear edge of the cap 24 passes beyond the edge of the plate 25, the said cap by gravity falls into the adjacent recess 18 in the edge of the disk 17 and is carried around under the shield 22, and deposited between the dies (not yet explained, but which will be hereinafter referred to) at which point the cap is operated upon as will be hereinafter explained, and is then carried around in its finished condition, under the remaining portion of the shield 22, and is permitted to fall through the opening 27 in the guide way 16 into any suitable receptacle which may be provided. The object in so constructing the parts that the star wheel 12 and its immediate attachments may have an intermittent movement, is to permit the cap to remain between the dies for a sufficient length of time to be operated upon in forming the corrugation, scoring and attaching the handle thereto.

*Corrugating and scoring mechanism.—* The corrugating and scoring elements consist of the lower die 28 set into the forward edge of the guide way 16, and having its upper surface in the same plane as the upper surface of said guide way. Extending transversely across the face of said die 28 is a groove or channel 29 through which the under lugs 19 of the disk 17 may pass as the edge of the said disk 17 moves over the said die. The said die 28 is the female die and is provided with the concentric groove 30 and the transversely extending groove 31, or any other character of grooves for corrugating or scoring may be provided. The forward edge of the said die 28 is provided with an anvil 32 for turning the ends of the staple, as will be hereinafter explained. In front of the said anvil 32 is located one member 33 of the handle stock cutter, the operation of which will also be hereinafter explained. The breast plate 34 extends from one of the standards 2 to the other standard, and is provided with vertical channels 35 which receive the stem 36 of the upper or male die 37. The said male die 37 is located vertically above the female die 28 and is provided on its under face with beads or ribs, corresponding to the recesses and corrugations 30 and 31 in the die 28. As the said die 37 moves vertically to its uppermost position when the lugs 19 of the disk 17 pass thereunder the said upper die 37 is not transversely grooved across its face, as is the lower die 28 at 29. The stem 36 of the die 37 is provided with a vertically extending slot or perforation 38, through which a stirrup (as will be hereinafter explained) passes. The upper end of the stem 36 is provided with the two angular extensions 39—39, the upper ends of which are bent forward over the upper edge of the breast plate 34. The coil springs 40 are interposed between the upper edge of the breast plate 34 and the forwardly extending ends of the extensions 39. The tension of the said springs 40 is such as to have a tendency to lift the stem 36 and its attachments and maintain the same in elevated positions.

The yoke 41 surrounds the shaft 3 which passes through the elongated opening 42 and the eccentric 43 is fixed to the shaft 3. The upper side bar 44 is fixed to the yoke 41 as is also the lower side bar 45. The eccentric 43 is located between the side bars 44 and 45 as shown in Fig. 4 of the drawing. As the shaft rotates the eccentric 43 is carried around and pressed down upon the lower side bar 45 which in turn forces the yoke 41 down. The side bar 45 is located just above one of the extensions 39 of the upper die stem 36. Said side bar strikes the extension 39 and forces the stem 36 down against the tension of the springs 40. Thus the die 37 is moved down into engagement with the cap located upon the die 28, which has been previously deposited there by the disk 17, as above described. When the upper die 37 moves down the cap is corrugated and scored and the handle is attached thereto, as will be hereinafter explained. As the eccentric 43 continues to revolve it ceases to exert pressure upon the side bar 45 and immediately begins to press up the side bar 44, which lifts the yoke 41, which in turn lifts the side bar 45 from the end of the extension 39, and the coil springs 40 bring the stem 36 and die 37 into elevated positions.

*Staple forming and driving mechanism.*— The guide 46 is fixed to the front side of the breast plate 34. The edge of the said guide extends beyond the edge of a vertically extending recess 47 located in the front face of the breast plate 34. Within the said recess is located a sliding cutter bar 48. The thimble 49 extends horizontally into and projects at its inner end slightly beyond the inner face of the recess 47. Said thimble is made of hardened steel and may be easily and readily removed. The said thimble is provided along its longitudinal axis with a perforation 50. The edge of the cutter bar 48 is recessed or cut away as at 51 in order to receive the inner end of the thimble 49 as the said cutter bar 48 descends. The cutter 52 is located in the lower edge of the cutter bar 48 and is adapted to move just past the inner end of the thimble 49. The cutter 52 is made of hardened steel and may easily and readily be removed without disturbing the balance of the parts of the machine, thus, when one cutter becomes dull or worn out, it may be taken out and another inserted in its stead. The upper end of the cutter bar 48 is attached to the lower end of the yoke 41, thus as the said yoke 41 is raised or lowered by the eccentric 43 as hereinafter described, the said cutter bar 48 is raised and lowered, and as the said bar descends the cutter 52 passes by the inner end of the thimble 49 and cuts the wire 53 which enters through the perforation 50 of said thimble into the recess 47 in proper lengths for forming the staples. The shank 54 of the stirrup 55 is hinged at the upper back edge of the breast plate 34. The yoke 56 is attached at its ends to the breast plate 34 and passes around the shank 54 of the said stirrup. The said yoke is provided with an adjustable screw 57 between the inner end of which and the said shank is interposed a coil spring 58. By adjusting the screw 57 the tension of the said coil spring 58 may be regulated. The yoke 56 is fixed, while the shank 54 is adapted to swing back and forth on its pivotal point.

The stirrup 55 consists of the upper piece, having the beveled forward end 59 with the recess 60 located at the lower edge thereof, and a lower piece 61. The two pieces of the stirrup 55 are adapted to fit in a perforation at the lower end of the shank 54. The said stirrup passes through the perforation 38 of the die stem 36 and the perforations 62 and 63 in the breast plate 34 as shown in Fig. 6 the forward end of the stirrup 55 or the recess 60 thereof is normally in alinement, or substantially so, with the inner end of the thimble 49, consequently, as the wire enters the recess 47 through the perforation 50 of said thimble 49 it enters the recess 60 of the stirrup 55 when the cutter bar 48 descends and cuts the wire as above described. The two sides of the said cutter bar, in continuing their descent, bend the two ends of the staple down vertically along the sides of the stirrup 55. The said recess 60 during the said operation retaining the intermediate portion of the staple. At the same time the chamfered edge 64 located at the back of the cutter bar 48 comes in contact with the beveled edge 59 of the stirrup 55 and pushes the said stirrup 55 and the shank 54 back against the tension of the coil spring 58 in the manner as shown in Fig. 3. This movement disengages the stirrup 55 from the staple and the staple plunger 65 which is located in a vertical groove cut in the face of the cutter bar 48 descends and forces the said staple through the handle stock and cap, which is retained under the die 37. The said staple plunger 65 is attached at its upper end to a yoke 66 which surrounds the crank shaft 3 in a manner similar to that described for the yoke 41. The said yoke 66 is provided at its lower edge with a transversely extending bar 67 and its upper end with a transversely extending bar 68. The cam 69 is fixed to the shaft 3 and is located between the bars 67 and 68. The periphery of said cam describes a circle with the exception of that portion between the characters *x*—*x*, which is slightly flattened in order to properly time the movement of the staple plunger 65 with relation to the cutter bar 48. The transverse bar 68 is pivoted at the point 70 and is provided at its opposite end with a slightly elongated perforation 71, which receives the pin 72 located upon the yoke 66. It will thus be seen that the end of the bar 68 containing the perforation 71 can have a slight movement. This is provided in order to compensate for the flattened section of the cam 69. As said flattened section passes under the bar 68 the said bar is maintained in contact with the same by means of the coil spring 73 the upper end of which is attached to a lug 74 carried by the bar 68 and the lower end of which is attached to the yoke 66.

*Wire feeding device.*—The wire feeding device consists of the block 75 which is adapted to reciprocate upon the guide 76 attached to the front side of the breast plate 34. The said block 75 is provided with a recess 77 in which is fixed an upper jaw 78 and a lower vertically movable jaw 79. The said jaws 78 and 79 are provided with the grooves 80—80 adapted to receive the wire 53. The coil spring 81 is attached at one end to the said block 75 and at its other end to one of the standards 2. The tension of the said spring 81 has a tendency to draw the said block 75 toward the said standard 2, to which the end of the said coil spring is attached. The dog 82 is pivoted at its lower end in the block 75 just under the lower jaw 79. The lower edge of the said jaw 79 being provided with a recess 83 to receive the upper edge of the horizontal portion 84 of the said dog 82. The said dog extends vertically along the sides of the jaws 78 and 79 and the upper end of the dog is above the recess 77 containing the said jaws. The lower end of the bell crank lever 85 is pivoted to the upper end of the dog 82. Said bell crank lever is fulcrumed to the breast plate 34 at the point 86 and the other end of said bell crank lever terminates above the pin 87 which is carried by the staple plunger 65. The stop 88 is located on the face of the block 75 and is adapted to limit the outward movement of the dog 82. One end of the coil spring 89 is attached to the lower end of the bell crank lever 85 and the other end of said coil spring is attached to the standard 2. The tension of said coil spring has a tendency to draw the lower end of the bell crank lever 85 toward the standard 2 to which the end of said spring is attached.

The operation of the wire feeding device is as follows:—As the staple plunger 65 moves up, the pin 86 bears against the under side of the shorter end of the bell crank lever 85 and moves the said lever on its fulcrum point 86 and carries the lower end of said bell crank lever toward the wire cutting device above described. This inward movement of the lower end of the bell crank lever 85 carries the upper end of the dog 82 forward, which causes the horizontal portion 84 thereof to turn slightly. The edge of said portion 84 coming in contact with the wall of the recess 83 of the jaw 79 slightly elevates the said jaw, which clamps the wire 53 between the jaws 78 and 79 and at the same time the block 75 is carried toward the wire cutting device, and the wire which is impinged between the jaws 78 and 79 is pushed through the perforation 50 of the thimble 49. As the staple plunger descends the coil spring 89 pulls the lower end of the bell crank lever toward the standard 2 which causes the upper end of the dog 82 to move back against the stop 88, and the horizontal portion 84 thereof slightly turns so that the lower jaw 79 may release its clasp upon the wire 53, at the same time the coil spring 81 pulls the block 75 back toward the standard 2. It will thus be seen that when the block 75 moves toward the staple forming device the wire 53 is clasped and as the said block moves away from the staple forming device the wire is released.

The standard 2 is provided with a perforation 90 through which the wire passes before entering the block 75. The collar 91 is located in the said standard 2 and is provided with an elongated perforation 92, as shown in Fig. 14. The inner edge of the said collar 91 is chamfered as at 93 and the slightly elevated portion 94 is provided in the path of the perforation 92 at the end of the said collar 91. The block 95 is located between the chamfered edge 93 and the said elevated portion 94. The edge of the block 95 that comes in contact with the chamfered surface 93 of the collar 91 is chamfered to correspond with the said surface 93 and the forward lower corner of said block is adapted to rest upon the elevated portion 94 located at the end of the perforation 92. The coil spring 96 bears at one end against the block 95 and is housed in the recess 97 which receives one end of the collar 91. The tension of said spring is such as to have a tendency to maintain the lower edge of the block 95 in contact, or nearly so with the elevated portion 94 of the collar 91. The wire 53 is adapted to pass through the perforation 92 and between the elevated portion 94 of the lower edge of the block 95 then through the coil spring 96 and then the perforation 90 in the standard 2, from which point it passes through the block 75 as above described. It will thus be seen that the position of the block 95 is such as to pinch the wire 53 and permit it to pass toward the block 75 and check it from passing away from the said block.

*Handle stock feeding mechanism.*—To the lower end of the shaft 10 is fixed a wheel 96′ said wheel having at its periphery a number of teeth 97′ which are pitched substantially in the line of tangents to the periphery of the wheel 96′. The rod 98 is located on the base plate 1 of the machine and is provided at one end with the loop 99 which surrounds the shaft 10. On the upper face of the loop 99 and at the end thereof is located a pin 100 surrounded by a roller 101. The opposite end of the rod 98 is provided with the transversely extending groove 102. The end of said rod provided with the groove 102 extends along the surface of the bed plate 1 and is located in front of the dies above described. The frame 103 is adapted to reciprocate back and forth in the line of the dies. Said frame is confined at its edges in suitable guides 104 attached to the bed plate 1. The dog 105 made in the form of a small bell crank lever, is fulcrumed in said frame 103, the lower end of the said bell crank lever 105 entering the recess 102 of the rod 98. The stop 106 is provided in the frame 103 for limiting the outward movement of the lower end of the said bell crank lever 105. The upper or shorter end of said bell crank lever 105 is adapted to move toward the top of the frame 103 when the said frame moves toward the dies. One end of the coil spring 107 is attached to the longer or lower end of the bell crank lever 105 and the other end of the said coil spring 107 is fixed to the upright 108 which in turn is fixed in stationary position to the base or bed plate 1. The tension of the said coil spring 107 is such as to have a tendency to draw the frame 103 toward the upright 108. The horizontal portion 109 is arranged at the upper end of the upright 108, said horizontal portion extending in alinement with the longitudinal axis of the frame 103. The top piece 110 is located above the horizontal portion 109 and is slightly spaced away from the same. The said top is provided with the transversely extending opening 111 which receives a collar 112. The said collar also surrounds the horizontal portion 109 of the upright 108. The coil spring 113 is interposed between the lower portion of the collar 112 and the under side of the horizontal piece 109. The tension of said coil spring 113 is such as to have a tendency to keep the upper portion of the collar 112 in contact with the upper surface of the horizontal portion 109 of the upright 108. The handle stock 114 passes through the space between the top 110 and the horizontal portion 109 then under the upper portion of the collar 112 then under top of the frame 103 and over the upper or shorter end of the bell crank lever 105 and then between the dies. To the front edge of the die 28 is fixed a cutting disk 33 over the upper edge of which the said handle stock 114 passes and to the lower portion of the cutter bar 48 is fixed a knife 116 which is adapted to reciprocate vertically in a line just inside of the inner edge of the disk 33. Said disk is rotatably mounted by means of a pin or screw 117 which passes through the center of the disk and enters the die 28.

The operation of the handle stock feeding and cutting device is as follows:—As the shaft 10 rotates and carries around the disk 17 as above described for conveying the caps, the wheel 96' is also rotated in the direction of the arrow as indicated in Fig. 8. As the roller 101 of the pin 100 rides up upon the inclined sides of the teeth 97', the bar 98 is moved longitudinally, which movement causes the bell crank lever 105 to swing on its fulcrum and the upper or shorter end thereof impinges the handle stock 114 against the under side of the top of the frame 103. At the same time the said frame 103 is pulled toward the dies 28 and 37 and the inner end of the handle stock 104 is carried between the said dies. This operation of course takes place after the cap has been deposited between the dies and before the upper die 37 descends. After the handle stock is inserted as above described the die 37 descends as does also the staple plunger 65, and the staple is driven through the handle stock and cap, as above described. As the cutter bar 48 descends the knife 116 cuts the handle stock 114 at the edge of the disk 33 which is also at the edge of the cap located between the dies 28 and 37, at which time the pin 100 escapes the end of the tooth 97', and the coil spring 107 pulls the frame 103 away from the dies and moves the rod longitudinally toward the front of the machine. At the same time the said coil spring 107 pulls down the upper or shorter end of the bell crank lever 105 and thereby releases its grip upon the handle stock 114 which remains stationary while the frame 103 rotates. When the operation above described is repeated, the bell crank lever 105 again impinges the handle stock 114 and in conjunction with the frame 103 carries the same forward, as above described. The collar 112, acting in conjunction with the horizontal portion 109 of the upright 108 is for the purpose of preventing the handle stock 114 from moving back as the frame 103 moves back. The spring 113 holds the upper portion of the collar 112 down against the handle stock 114 which offers sufficient friction to prevent the backward or outward movement of the handle stock 114 as the frame 103 moves toward the upright 108, but does not offer sufficient friction to prevent the frame 103 and the bell crank lever 105 from drawing the handle stock 114 under the top 110 as the said frame 103 moves toward the dies 28 and 37.

I do not wish to limit all features of my invention to employment in connection with means for corrugating or scoring the sheets, stock or blanks, and means for feeding handle or tab stock to or across the sheets or disk stock and for securing the same thereto can be employed independently of the dies or other corrugating or scoring means, and it is evident that various changes and modifications might be resorted to, and that elements might be omitted and features added, without departing from the spirit and scope of my invention as specified by the claims.

Having described my invention what I claim as new and desire to secure by Letters-Patent is:—

1. A machine of the character as described consisting of a cap receptacle, a set of cap compressing dies, handle applying means comprising a staple forming and driving mechanism, and a means for conveying the caps successively from the cap receptacle to the dies.

2. A machine of the character as described consisting of a cap receptacle, a set of cap compressing dies, a handle stock feeding mechanism, means for applying handles to caps while between the dies and a means for conveying the caps successively from the cap receptacle to the dies, all of said elements being operatively connected with each other.

3. A machine of the character as described consisting of a cap receptacle, a set of cap compressing dies, a staple forming and driving mechanism for applying handles to caps while between the dies, a handle stock feeding mechanism, a means for conveying the caps successively from the cap receptacle to the dies, and a single rotating shaft operatively connected with all of said elements.

4. A machine of the character as described consisting of a cap receptacle, a set of cap compressing dies, means for applying handles to the caps, a handle stock feeding mechanism, a means for conveying the caps successively from the cap receptacle to the dies and a single rotating shaft, all of said elements being operatively connected with each other through the said rotating shaft.

5. A machine of the character as described consisting of a set of cap corrugating dies, means for applying handles to the caps at the corrugating position, and a means for conveying the caps successively to the dies.

6. In a machine of the character as described, a cap conveyer consisting of a rotating disk having cap recesses cut therein, a means for placing a cap in each recess and handle applying means to which said caps are successively presented by said disk.

7. In a machine of the character as described, a cap conveyer consisting of a rotating disk having cap recesses cut in the edge thereof, a means for placing a cap in each recess and handle applying means to which said caps are successively presented by said disk.

8. In a machine of the character as described, a cap conveyer consisting of a rotating disk having cap recesses cut in the edge thereof with the edges of the recesses merging into the edge of the disk, a means for placing a cap in each recess and handle applying means to which said caps are successively presented by said disk.

9. In a machine of the character as described, a cap conveyer consisting of a rotating disk having cap recesses cut therein, a cap tube located above the path described by said recesses and handle applying means to which said caps are successively presented by said disk.

10. In a machine of the character as described, a cap conveyer consisting of a rotating disk having cap recesses cut in the edge thereof, a cap tube located above the path described by said recesses and handle applying means to which said caps are successively presented by said disk.

11. In a machine of the character as described, a cap conveyer consisting of a rotating disk having cap recesses cut in the edge thereof with the edges of the recesses merging into the edge of the disk, a cap tube located above the path described by said recesses and handle applying means to which said caps are successively presented by said disk.

12. In a machine of the character as described, a cap conveyer consisting of a rotating disk having cap recesses cut therein with lugs located at the rear edges of said recesses and a means for placing caps in the path of movement of said lugs.

13. In a machine for making receptacle closures, in combination, a cap conveyer consisting of a rotary disk having cap recesses with lugs located at the rear edges of said recesses and on the upper and lower sides of the disk, and guide means having guide ways for said lugs.

14. In a machine of the character as described, a cap conveyer consisting of a rotating disk having cap recesses cut therein with lugs located at the rear edges of said recesses, and a cap tube located above the path described by said recesses and having in its lower end a plate slotted to receive said lugs.

15. In a machine of the character as described, a cap conveyer consisting of a rotating disk having cap recesses cut therein, handle applying means to which the caps are conveyed by said disk, a shield located over path described by said recesses, and a means for placing a cap in each recess.

16. In a machine of the character as described, a cap conveyer consisting of a rotating disk having cap recesses cut therein, handle applying means to which the caps are conveyed by said disk, a shield located over the path described by said recesses, and a cap tube located over the path described by said recesses.

17. In a machine of the character as described, a cap conveyer consisting of a rotating disk having cap recesses cut therein, with lugs located at the edges of said recesses, a shield located over the path described by said recesses and having a channel receiving said lugs and a cap holder to present caps successively to said lugs.

18. In a machine of the character as described, a cap conveyer consisting of a rotating disk having cap recesses cut therein with lugs located at the edges of said recesses, and a shield located over the path described by said recesses, and a cap tube located over the path described by said recesses.

19. In a machine of the character as described, a cap conveyer consisting of a rotating disk having cap recesses cut therein with lugs located at the rear edges of said recesses, and on the upper and under sides of the disk, a cap tube located above the path above described by said recesses and having in its lower end a plate slotted to permit the passage of said upper lugs, and a guide way having a groove to receive said under lugs of the disk.

20. In a machine of the character as described, a cap conveyer consisting of a rotating disk having cap recesses cut therein with lugs located at the rear edges of said recesses, a cap tube located above the path described by said recesses, and a guide way having a groove receiving said lugs.

21. In a machine of the character as described, a cap conveyer consisting of a rotating disk having cap recesses cut therein with lugs located at the rear edges of said recesses, a means for presenting caps to said lugs, a guide way having a groove receiving said lugs.

22. In a machine of the character as described, a cap conveyer consisting of a rotating disk having cup recesses cut therein with lugs located at the edges of the said recesses and on the upper and under faces of the disk, a shield located over the path described by said recesses, and having a channel receiving the under lugs, and means having a guide-way for the under lugs.

23. In a machine of the character as described, a cap conveyer consisting of a rotating disk, having recesses with lugs located at the edges of said recesses and on the upper and under faces of the disk, a shield located over the path described by said recesses and having a channel receiving the upper lugs, a guide way having a groove receiving the under lugs, and a cap tube located over the path described by said recesses.

24. In a machine of the character as described, a cap conveyer consisting of a rotating disk having recesses with lugs located at the edges of said recesses and on the upper and under faces of the disk, a shield located over the path described by said recesses and having a channel receiving the upper lugs, a guide way having a groove receiving the under lugs, and a cap tube located over the path described by the said recesses and having in its lower end a plate slotted to permit the passage of the upper lugs therethrough.

25. In combination, intermittingly moving cap stock and handle stock feeding devices, actuating means for simultaneously moving said devices on their feeding strokes and for periodically holding the same at rest, and stapling mechanism for periodically uniting handle stock and cap stock.

26. In combination, stapling mechanism provided with means for intermittingly actuating the same, means for periodically presenting cap stock to said mechanism, and means for periodically feeding handle stock across the cap stock while at the stapling mechanism and intermediate the stapling operations.

27. In combination, in a machine for producing closing disks provided with handles secured thereto, means for feeding handle stock across the face of the cap stock, and mechanisms for severing the handle stock into lengths and securing the separate lengths to the cap stock, substantially as described.

28. In a machine for making receptacle closures having flat handles on the top faces thereof, in combination, mechanism for successively presenting areas of disk forming material at the handle stapling position, flat-handle-forming mechanism, and mechanism for applying handle-securing staples through said areas and within the boundaries thereof, substantially as described.

29. A machine for making closing disks comprising coöperating disk gripping dies, means for securing pull tabs to and on the top faces of the disks while held by the dies, and means for successively presenting disk stock to said dies and for removing the handled disks therefrom.

30. A machine for producing closing disks having handles applied thereto, comprising means for gripping and holding each disk at the handle-receiving position, feeding means for successively presenting the disks at the handle-receiving position, means for supplying disks to said feeding means, and means for stapling the handles on the top faces of the disks at the handle-receiving position.

31. A machine for producing handled closing disks, comprising means for successively receiving the disks at the handle-receiving position, means for feeding handle stock across the top face of each disk at the handle-receiving position, and staple forming and driving means for stapling a length of handle stock to each disk at the handle-receiving position to form each disk with a handle on its top face.

32. A machine for producing closing disks having handles, comprising step by step disk stock feeding means, step by step handle stock feeding means, and intermittently operating handle stock cutting and stapling devices.

33. A machine for producing corrugated closing caps, comprising a pair of coöperating intermittently operating disk compressing and corrugating dies, handle applying means coöperating therewith and intermittently operating means for successively presenting disks to said dies and for moving the corrugated disks from said dies.

34. In combination, a table, a rotary disk having cap receiving recesses and adapted to move the caps along the table, said table at one point having an opening therethrough for discharging the caps, means for presenting handle stock above said disk, and mechanism for stapling said handle stock to the caps.

In testimony whereof I affix my signature, in presence of two subscribing witnesses.

ALBERT B. HINES.

Witnesses:
E. WEAVER,
ERNEST F. RILEY.

Copies of this patent may be obtained for five cents each, by addressing the "Commissioner of Patents, Washington, D. C."